Dec. 5, 1939.  E. P. FLEMING ET AL  2,182,078
PRODUCTION OF AMMONIA FROM AMMONIUM SULPHATE
Filed Sept. 28, 1936  2 Sheets-Sheet 2
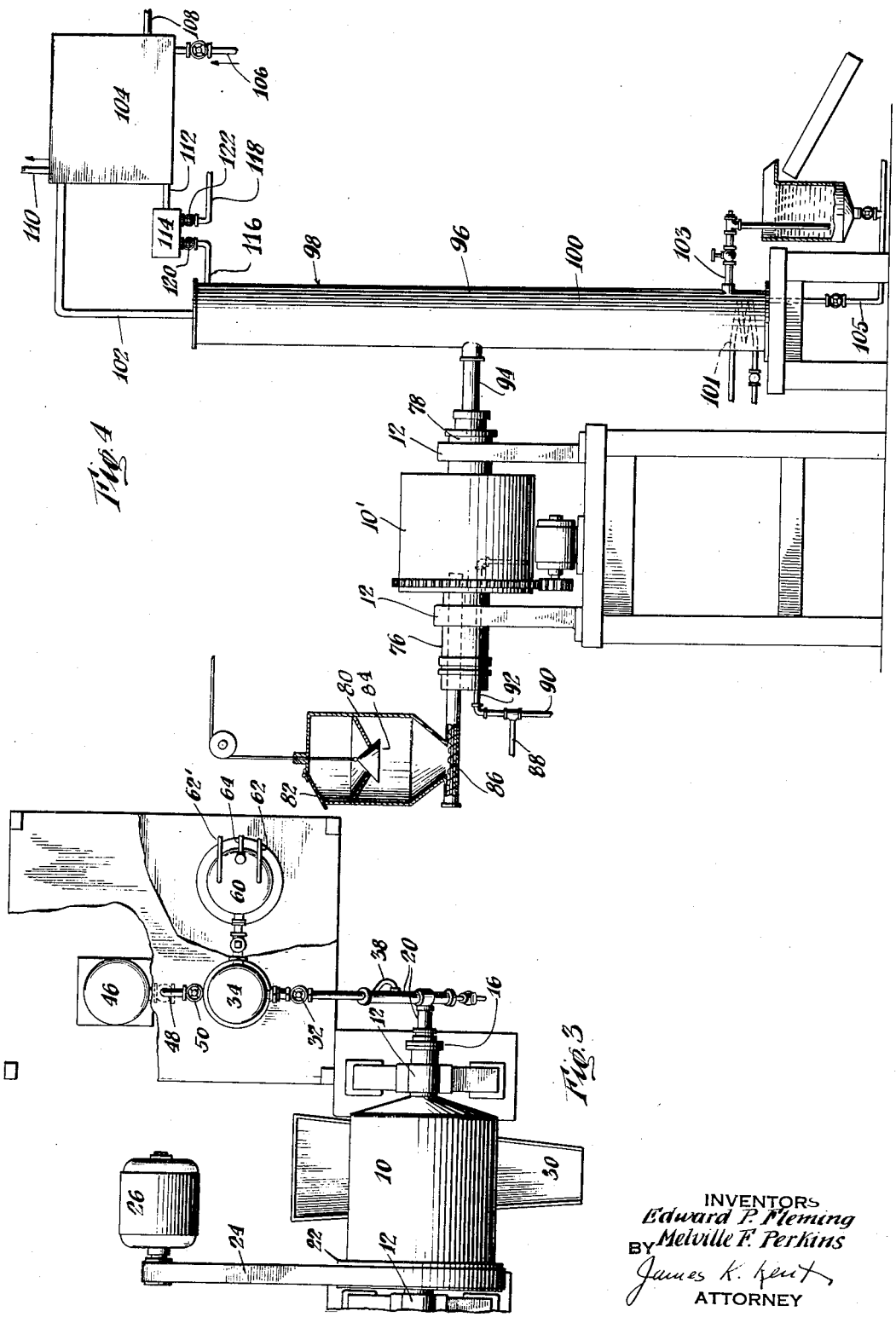
INVENTORS
Edward P. Fleming
Melville F. Perkins
BY
James K. Kent
ATTORNEY Patented Dec. 5, 1939

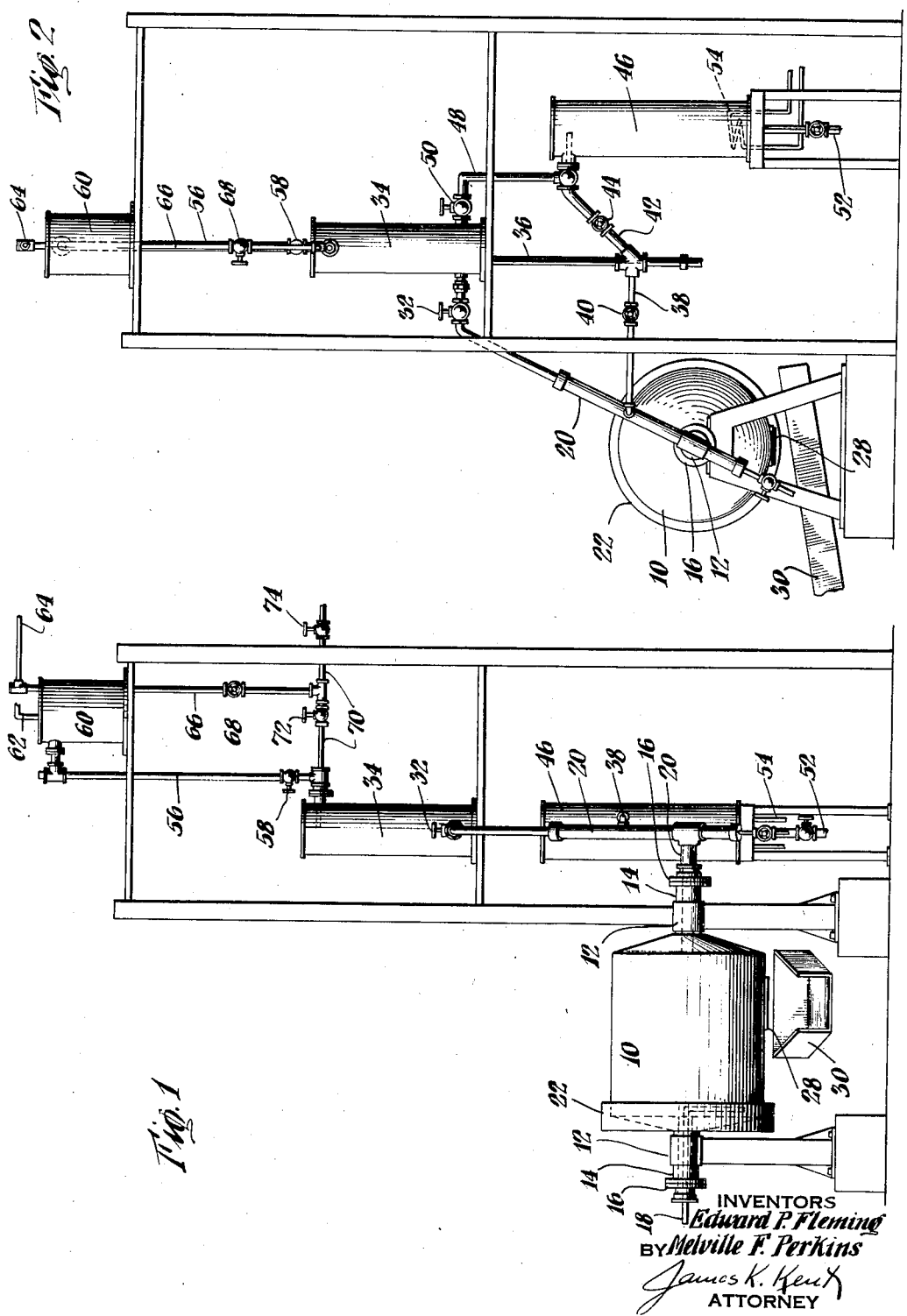

2,182,078

UNITED STATES PATENT OFFICE 2,182,078

PRODUCTION OF AMMONIA FROM AMMONIUM SULPHATE

Edward P. Fleming, Salt Lake City, Utah, and Melville F. Perkins, Woodbridge, N. J., assignors to American Smelting and Refining Company, New York, N. Y., a corporation of New Jersey Application September 28, 1936, Serial No. 102,910

2 Claims. (Cl. 23—193)

This invention relates to the production of ammonia from ammonium sulphate by reaction with lime and provides a novel process by which the ammonia is readily released and recovered in a highly purified and concentrated form. Losses of ammonia are very small and the process is at once efficient and economical.

Among other features, the invention provides a novel process and improved apparatus by which a volatile substance may be readily released and recovered in a highly purified and concentrated form with very little loss of the substance.

An outstanding application of the invention and one with reference to which the invention will be described is that of recovering ammonia from ammonium sulphate by reaction with lime, although it will be understood that it may be applied with equal success to the recovery of other volatile substances released in a similar manner.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which Fig. 1 is a side elevation of apparatus for practising the invention;

Fig. 2 is a side elevation taken at right angles to the view shown in Fig. 1;

Fig. 3 is a plan view of the apparatus shown in Figs. 1 and 2; and

Fig. 4 is a modified form of apparatus adapted for continuous operation.

Like reference characters denote like parts in the several figures of the drawings.

Referring to Figs. 1, 2 and 3, 10 indicates a rotatable drum supported by bearings 12, the drum 10 being provided with hollow trunnions 14 equipped with slip joints 16 which permit rotation of the drum 10 without rotation of inlet 18 and delivery pipe 20. A belt pulley 22 is mounted on one end of drum 10 for effecting rotation of the drum by belt 24 driven by motor 26. A gas-tight door 28 is positioned in the wall of drum 10 above discharge chute 30.

From the drum 10, delivery pipe 20 provided with valve 32 leads to rectifying column 34. A return passageway from the bottom of rectifying column 34 to delivery pipe 20 is provided by pipes 36 and 38, the latter being equipped with valve 40. A pipe 42 having valve 44 connects pipe 36 with exhausting column 46. A pipe 48 equipped with valve 50 leads from the top of exhausting column 46 to rectifying column 34. Exhausting column 46 is also provided with an outlet 52 and steam coil 54.

Pipe 56 equipped with valve 58 leads from the top of rectifying column 34 to reflux condenser 60, the latter being provided with cooling fluid inlet and outlet 62, 62', vapor outlet 64 and pipe 66 equipped with valve 68 terminating in pipe 70 equipped with valves 72 and 74.

In the modification shown in Fig. 4, the drum 10' is equipped with extra large hollow trunnions 76 and 78. A charging device 80 provided with gas-tight door 82 and bell valve 84, communicates with charge screw 86 which delivers the charge to the interior of the drum 10' through hollow trunnion 76. Pipes 88 and 90 communicate with the interior of the drum 10' through pipe 92 via hollow trunnion 76. A delivery pipe 94 leads from the interior of the drum 10' through hollow trunnion 78 to the column 96 comprising a rectifying section 98 and exhausting section 100, the latter being equipped with steam coil 101, outlet 103 and drain 105. A pipe 102 interconnects the top of column 96 and condenser 104, the latter being provided with cooling fluid inlet and outlet 106, 110 and ammonia outlet 108. Pipe 112 leads from condenser 104 to control box 114 from which extend two pipes 116 and 118 equipped with valves 120 and 122, said pipes communicating with column 96 and to storage or other apparatus, not shown, respectively.

Employing the type of apparatus shown in Figs. 1, 2 and 3, the drum 10 is rotated to bring the door 28 to the top of the drum. The proper quantities of impure ammonium sulphate crystals or sludge, the reagent employed to release the ammonia, e. g., burned lime, and water are charged to the drum which also contains metal balls or pebbles.

The door 28 is closed to its gas-tight position and rotation of the drum effected by motor 26 operating on belt pulley 22 via belt 24, thus subjecting the charge to an efficient grinding action by reason of the balls or pebbles in the drum 10.

As the rotation of the drum progresses, heat is applied thereto, preferably by steam introduced through inlet 18 to expel the ammonical vapors through the outlet or delivery pipe 20 into the rectifying column 34. From the rectifying column, the enriched ammonical vapors pass into reflux condenser 60 and are condensed by water passed therethrough via a cooling coil having inlet and outlet 62, 62'. Any uncondensed vapor is vented through pipe 64 to appropriate recovery or otherwise and the enriched condensed ammonical liquor is withdrawn from the condenser via pipe 70 through valve 74. Any desired reflux can be supplied through the rectifying column 34 simply by opening valve 72 in pipe 70.

The improverished liquid drawn from the bottom of the rectifying column 34 through pipe 36 may be returned to the drum by opening valve 40 in pipe 38. However, in case the amount so refluxed is sufficient to fill the drum to the level of the outlet 20, such reflux can be diverted to the exhausting column 46 simply by closing valve 40 and opening valve 44. In the exhausting column provided with steam coil 54, the exhausted liquid is withdrawn through pipe 52 while the ammonia is returned to the rectifying column 34 via pipe 48 and valve 50.

Whereas the type of apparatus shown in Figs. 1, 2 and 3 is adapted primarily for batch operation, the modified type shown in Fig. 4 is well suited for continuous operation. Thus, in employing the apparatus illustrated in the latter figure, a charge consisting of sulphate crystals and lime in proper proportions is introduced into the upper chamber of charging device 80 through door 82. The door 82 is then closed to its gas-tight position and the charge fed to the drum 10' via screw 86 by opening the bell valve 84. The necessary water is supplied to the drum 10' through pipe 88—92. Rotation of the drum containing the charge and the necessary balls or pebbles is effected by the motor operating on the ring gears as illustrated.

By application of heat supplied in the form of steam through pipe 90—92, the ammonical vapors pass through delivery pipe 94 into column 96. The enriched vapors pass from the top of the rectifying section 98 into absorber 104 which is cooled by water introduced through pipe 106 and exited through pipe 110. Any uncondensed vapor escapes by way of pipe 108 from which it may be passed into another condenser or otherwise disposed of. The condensed ammonical liquor is withdrawn from the control box 114 to storage or other disposal by way of valve 122. Any reflux desired for the rectifying section 98 is supplied by opening valve 120 which is placed in the line between the control box and the rectifying section.

As this apparatus is designed for continuous operation, the sludge which works out from drum 10' into the delivery pipe 94 is withdrawn from the bottom of the exhauster section 100 through pipe 103. By providing the steam coil 101 in the bottom of the exhauster section, the ammonia from the exhausted sludge and water works upwardly to the condenser via the rectifying column 98.

The efficiency of the invention is amply witnessed by the following specific example employing apparatus of the type illustrated in Figs. 1 to 3: 600 parts by weight of ammonium sulphate crystals analyzing 25.6% $NH_3$ and containing, therefore, 153.6 parts by weight of $NH_3$, 400 parts by weight of burned lime and 700 parts by weight of water were charged to the drum containing sufficient cast iron balls to insure a thorough grinding action.

The mill was set in rotation and heat supplied by a regulated flow of steam through the appropriate trunnion inlet. The vapors leaving the drum through the delivery pipe in the opposite trunnion were passed into the bottom of the rectifying column. The concentrated ammonical vapor was withdrawn from the top of column 34 and passed into the water-cooled reflux condenser where part of the vapor stream was condensed and returned to the top of column 34 as reflux liquid via pipes 66—70 and valve 72, and the remainder of the vapor stream which contained the larger amount of ammonia was passed into a water-cooled absorber containing water, thus producing highly concentrated aqueous ammonia. Due to the relatively high temperature of the cooling water used in this particular test, all of the liquid condensed in the reflux condenser was used as reflux to the column, hence the product was obtained by recovery of the ammonia in the vapor vented at pipe 64. The reflux from the bottom of the rectifying column was returned to the mill and by reason of the small quantity of steam employed, it was unnecessary to use the exhausting column of the rectification system as the amount of reflux was insufficient to rise above the level of the vapor outlet in the trunnion.

The residue in the mill was calculated to be 2150 parts by weight analyzing only 0.12% $NH_3$ or 2.6 parts by weight thereof. Accordingly, the $NH_3$ recovery based on the residue was 98.3%. Based on the final distillate, there were obtained 153.8 parts by weight of $NH_3$ representing a recovery of slightly more than 100%, the excess no doubt being due to the small ammonia tie-up in the rectifying column from a prior run.

It is thought that the high recoveries and other beneficial results attained through the use of the present invention may be best explained on the following basis: in releasing a volatile substance such as ammonia by reacting the carrier thereof with a reagent such as lime, one or more insoluble end products are formed as may be illustrated by the following equations:

$$CaO + H_2O + Aq \rightarrow Ca(OH)_2 + Aq \qquad (1)$$
$$Ca(OH)_2 + (NH_4)_2SO_4 + Aq \rightarrow CaSO_4 + 2NH_4OH + Aq \qquad (2)$$
$$CaO + H_2O + (NH_4)_2SO_4 + Aq \rightarrow CaSO_4 + 2NH_4OH + Aq \qquad (3)$$

As both calcium sulphate and calcium hydroxide are highly insoluble, the amount of either of these compounds in solution at any one time is very small. Further, the equations show that the calcium oxide requires hydration before, or coincident with, the time of interaction with the salt of ammonia and from Equation 3 it is evident that precipitation of the highly insoluble calcium sulphate starts at almost the inception of the reaction. Accordingly, under normal conditions the calcium sulphate as it precipitates collects on the particles of lime and calcium hydrate, which necessarily are present in the solid state because of their low solubility, and envelopes these particles with a highly impermeable coating or film which renders the lime non-available, diminishes or prematurely arrests the reaction rate, prevents dissolution of ammonium compounds not already in the solution and entraps solution containing dissolved ammonia. The present invention, by altering the otherwise normal environment so as to prevent insoluble end products from enveloping the reacting substances prior to their entrance into solution, permits the attainment of an equilibrium value closely approaching that which is indicated by the free energy of the reaction, namely, one effecting substantially complete release of the ammonia.

Of the various factors which contribute to change the normal environment to one by which the beneficial results of the invention are attained, that of subjecting the charge to an action of grinding or attrition is the most important. Thus, when a charge was rotated in the mill for one and a quarter hours without the balls and heated directly by steam in the manner already described, the ammonia eliminated was only 55%. By adding the balls and operating for one hour, the elimination was practically complete. Results show that sufficient grinding for 70% of the particles of the residue to pass a 100-mesh screen is satisfactory.

While the invention has been described with reference to performing the comminuting and agitating actions simultaneously in one device, this is not necessary as the grinding of the charge may be effected in a first closure and the charge so prepared, transferred to a second one in which it is agitated and heated. As a further alternative the necessary treatments can be conducted consecutively in the same apparatus. For example, in one instance a wet charge was ground cold in the ball mill for 20 minutes. Thereafter the balls were removed and the drum heated externally with a gas flame for 100 minutes while rotating at 50 R. P. M. The ammonia recovery from the impure crystals was 99%.

The details of construction and operation of the apparatus for recovering the ammonia will be influenced to a large extent by the manner in which the ammonia is to be utilized. Thus, for some purposes the ammonia concentration in the evolved vapor will be sufficiently high that the rectification system may be greatly simplified or even eliminated. Again, whether the operation is to be effected continuously or intermittently, is a factor to be considered in selecting a particular construction.

Accordingly, while certain novel features of the invention have been disclosed and are pointed out in the appended claims, it will be understood that various omissions, substitutions and changes may be made by those skilled in the art within the scope of the invention to adapt it to varying conditions and uses.

What is claimed is:

1. The process for obtaining pure, concentrated aqua ammonia from ammonium sulphate crystals which comprises grinding the crystals with lime and water in a gas-tight closure, the water being in amount insufficient to dissolve the bulk of the crystals continuously passing steam into direct contact with the reacting materials in the closure and withdrawing ammonical vapors therefrom, rectifying the said vapors and condensing the enriched vapors to yield the desired aqua ammonia.

2. In the process for recovering ammonia from ammonium sulphate by reacting the latter with lime in the presence of a quantity of water insufficient to dissolve the bulk of the ammonium sulphate, and with the application of heat thereto at substantially atmospheric pressure, that improvement which consists in grinding the materials during the process thereby carrying the reaction virtually to completion.

EDWARD P. FLEMING.
MELVILLE F. PERKINS.